United States Patent [19]

Lewis et al.

[11] 4,104,520

[45] Aug. 1, 1978

[54] IMAGE CHARGE RELAXATION IN ELECTROPHORETIC DISPLAYS

[75] Inventors: John H. Lewis; Kathrine J. Lewis, both of Los Angeles; Fremont Reizman, Northridge; Murray S. Welkowsky, Chatsworth, all of Calif.

[73] Assignee: Xonics, Inc., Van Nuys, Calif.

[21] Appl. No.: 800,025

[22] Filed: May 24, 1977

[51] Int. Cl.[2] .............................................. G03B 41/16

[52] U.S. Cl. ............................ 250/315 R; 250/315 A

[58] Field of Search ........................ 250/315 R, 315 A

[56] References Cited

U.S. PATENT DOCUMENTS 3,965,352 6/1976 Allen ............................... 250/315 A 4,053,768 10/1977 Lewis ............................... 250/315 A

*Primary Examiner*—Craig E. Church

*Attorney, Agent, or Firm*—Harris, Kern, Wallen & Tinsley

[57] ABSTRACT

An electrostatic imaging chamber providing a real time visual image. An imaging chamber with electrophoretic particles in the electrode gap, with the particles being selectively moved to a transparent electrode as a result of the electrostatic charge image formed by incoming radiation. An imaging chamber which can be cyclicly operated at a relatively high repetition rate, typically 10 to 20 images per second, thereby providing real time viewing of the object. A conductivity control layer at the gap for discharging the electrostatic charge image each cycle after viewing.

15 Claims, 11 Drawing Figures

FIG. 2A. FIG. 2B. FIG. 2C. FIG. 2D.
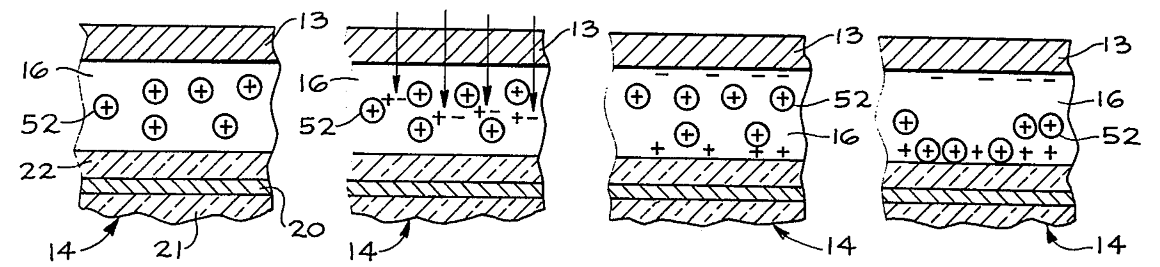
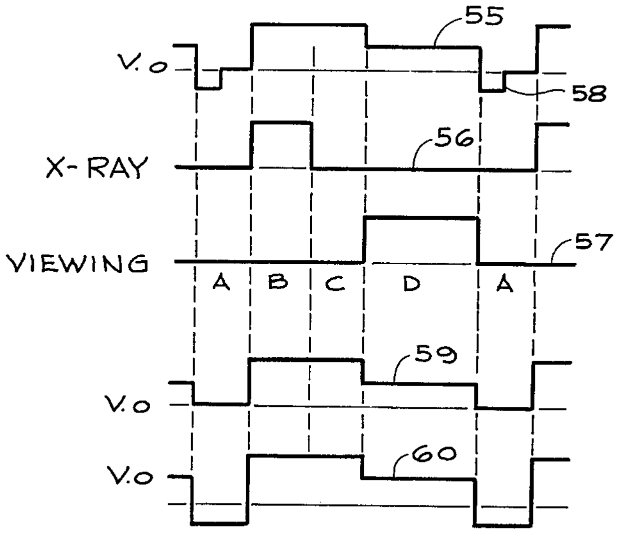
FIG. 3.
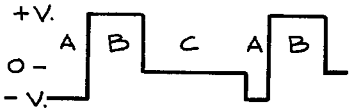
FIG. 5
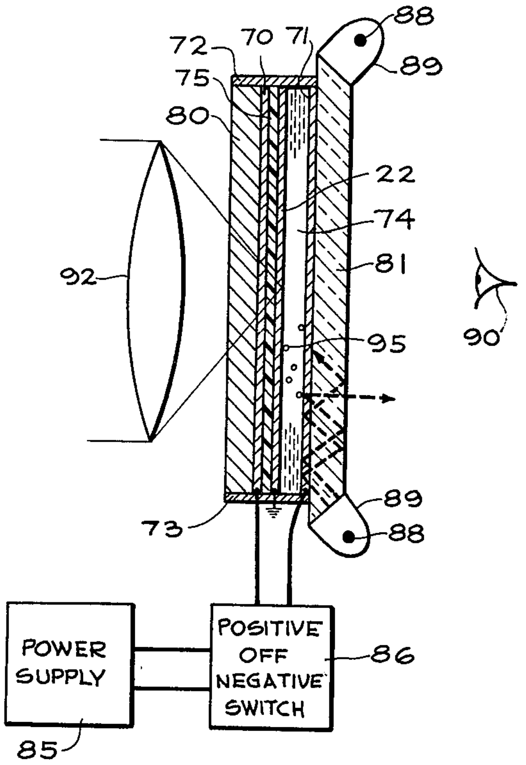
FIG. 4.
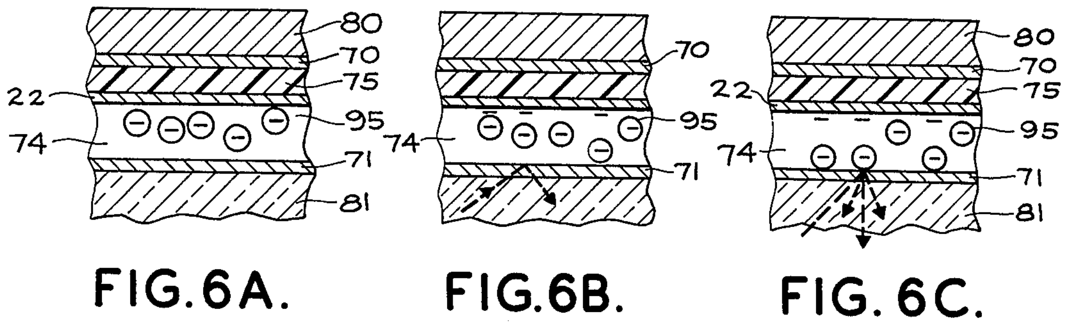
FIG. 6A. FIG. 6B. FIG. 6C.

IMAGE CHARGE RELAXATION IN ELECTROPHORETIC DISPLAYS

BACKGROUND OF THE INVENTION

This invention relates to electrostatic imaging and in particular, to systems providing for real time imaging. A real time imaging system is described in U.S. Pat. No. 3,965,352 and the present invention is directed to an improvement suitable for use in a system of the type disclosed in said patent.

In the prior art real time imaging system, an electrostatic charge image is produced by X-rays in an X-ray absorber which produces electrons and positive ions that are moved in an electric field to produce the electrostatic charge image at an electrode. Toner particles are used to produce a visible image. The toner particles are dispersed in a liquid which is in contact with the electrode on which the electrostatic image is formed. After formation of the electrostatic image, the toner particles are selectively moved toward or away from the electrostatic image to form a toner image corresponding to the electrostatic image. The toner particle image is then viewed through a transparent electrode by reflected or scattered light. This system produces a visible image in real time and the system may be operated cyclicly to permit continuous observation of the object being X-rayed.

Another real time imaging system is disclosed in the copending application of John H. Lewis, entitled Low Light Level and Infrared Viewing System, Ser. No. 830,787, assigned to the same assignee as the present application. In this system, electrophoretic particles are dispersed in a liquid in a gap between electrodes and a photoresponsive layer at one electrode produces an electrostatic charge image at the surface of the gap opposite the other electrode, either directly or through some form of image intensifier.

When either system is operated cyclicly for continuous real time viewing, the image must be erased in preparation for the next exposure and image formation. Typically, the real time imaging system is operated at 10 cycles per second providing 10 separate frames or images per second. It is an object of the present invention to provide a new and improved system for erasing an image by discharging the electrostatic image prior to the following X-ray exposure.

These and other objects, advantages, features and results will more fully appear in the course of the following description.

SUMMARY OF THE INVENTION

An electrostatic imaging chamber provides a visual image and includes first and second electrodes supported in spaced relation with a gap therebetween, with the first electrode being relatively transparent optically. A conductivity control layer is positioned at one surface of the gap.

In one example, an X-ray absorber and electron and positive ion emitter is positioned in the gap between the electrodes, with incoming X-ray radiation being absorbed and providing electrons and positive ions in the gap, with a plurality of electrophoretic particles also in the gap. An electric power source is connected across the electrodes for attracting electrons toward one electrode and positive ions toward the other depending upon the polarity of the power source. An electrostatic charge image is formed with the electrophoretic toner particles being selectively deposited at the conductivity control layer as a function of the electrostatic charge image, forming a visual image which is viewable through the first electrode. The conductivity control layer is positioned at the first electrode and functions to discharge the electrostatic charge image by conducting the charges from the gap face of the layer, through the layer to the electrode.

In another example, a photoresponsive layer is provided at the second electrode and produces electrical charges in response to incident visible or infrared radiation, resulting in an electrostatic charge image at the gap surface opposite the first electrode. The conductivity control layer is positioned at the gap surface opposite the first electrode and functions to discharge the electrostatic charge image.

In one embodiment, the conductivity control layer is a leaky insulator having a resistivity in a selected range so that the relaxation time of the layer is such that the electrostatic charges have leaked off prior to the next X-ray exposure. In an alternative embodiment, the conductivity control layer is a photoconductor material which is switched from a low conductivity state to a high conductivity state after viewing the visible image, to discharge the electrostatic image.

BRIEF DESCRIPTION OF THE DRAWINGS

FIGS. 2A - 2D are diagrams showing the electrode construction of the imaging chamber of the apparatus of FIG. 1 and illustrating one mode of operation of the apparatus;

FIG. 3 is a timing diagram for FIGS. 2A - 2D;

FIG. 4 is a diagrammatic illustration of a real time imaging system of the photoresponsive type incorporating the presently preferred embodiment of the invention;

FIG. 5 is a timing diagram for the device of FIG. 4; and

FIGS. 6A - 6C are diagrams illustrating the operation of the system of FIG. 4.

DESCRIPTION OF THE PREFERRED EMBODIMENTS

Figure 1:
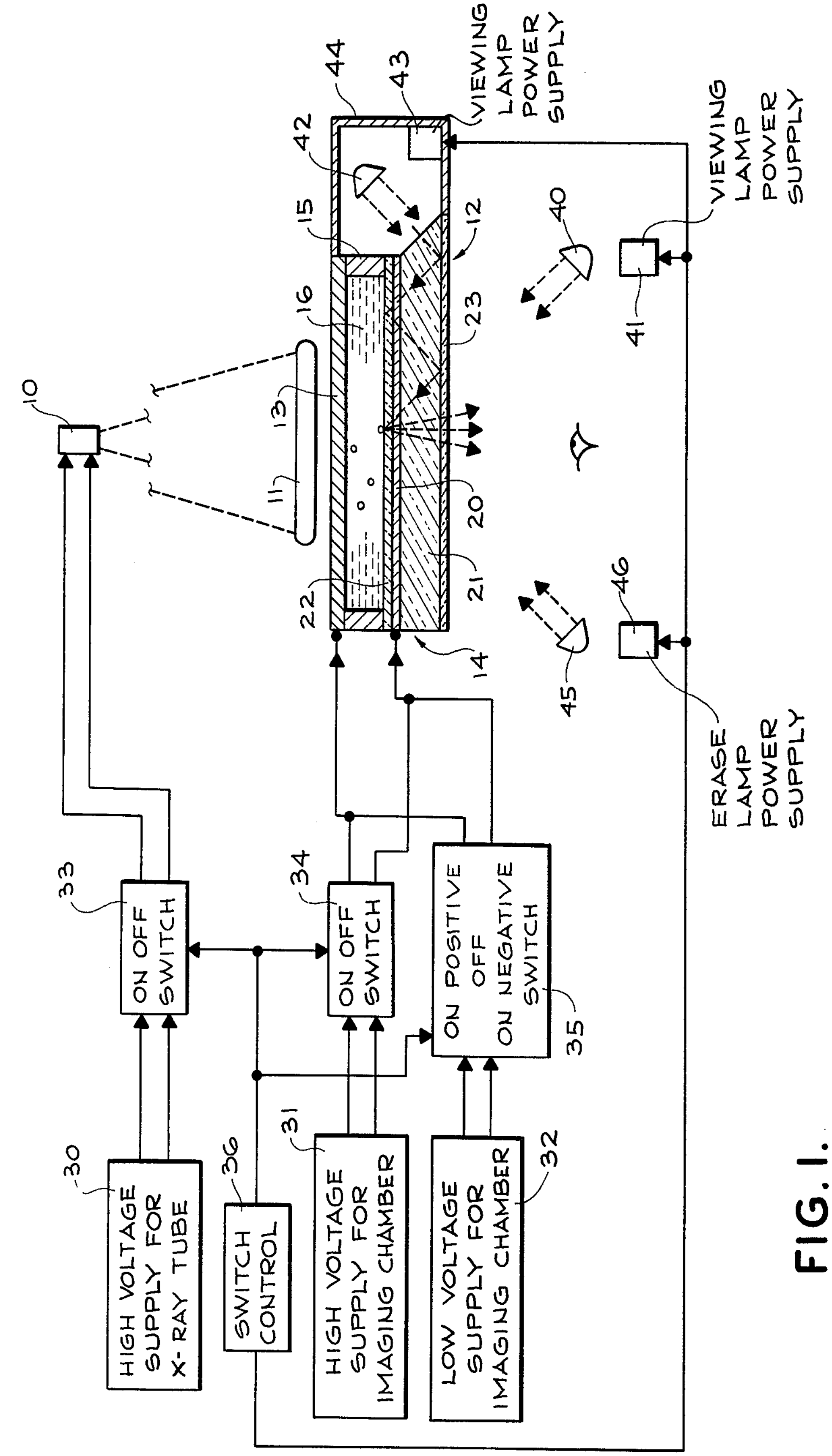
FIG. 1 is a diagrammatic illustration of a real time imaging system of the electronradiography type incorporating the presently preferred embodiment of the invention.

The imaging system of FIG. 1 is a real time system of the electronradiograph type. An X-ray source 10 directs radiation through a body 11 to an imaging chamber 12. The imaging chamber includes an upper electrode 13 and a lower electrode 14 separated by spacers 15 defining a gap 16 between the electrodes.

The upper electrode 13 should be of a material which is relatively transparent to X-ray radiation and beryllium is a preferred metal. The lower electrode 14 should be relatively transparent optically and typically may comprise a thin transparent film 20 of an electrical conducting material such as a metal oxide on a glass or plastic support plate 21. A conductivity control layer 22 is applied on the gap surface of the electrode film 20, and will be discussed in detail hereinbelow. If desired, a conventional non-reflecting film 23 may be applied on the outer surface of the support plate 21.

Electrical power supplies are provided for the X-ray source and the imaging chamber and typically may include a high voltage supply 30 for the X-ray tube, a high voltage supply 31 for the imaging chamber, and a low voltage supply 32 for the imaging chamber. The voltage supply to the X-ray source 10 is controlled by an on-off switch 33. The voltage supply to the imaging chamber 12 is controlled by an on-off switch 34 and another switch 35 which can provide a positive supply, a negative supply and an off condition. The sequence of operation of the switches 33, 34, 35 is controlled by a switch control unit 36.

The image formed in the chamber 12 may be viewed by transmitted light if both electrodes are optically transparent, by reflected light or by scattered light. These three modes of viewing are set out in detail in the aforesaid U.S. Pat. No. 3,965,352. FIG. 1 illustrates a lamp 40 energized from a power supply 41 directing radiation onto the electrode 14 for reflection illumination. Another lamp 42 energized from a power supply 43 is mounted in a closed housing 44 at one edge of the imaging chamber for directing radiation into the plate 21 to provide dark field illumination and scattered light viewing. A lamp 45 energized from a power supply 46 may be mounted for directing radiation to the layer 22 for purposes to be described.

In the embodiment illustrated, the gap 16 between the electrodes is filled with a liquid X-ray absorber and electron and positive ion emitter. Reference may be had to U.S. Pat. No. 3,873,833 for information on the liquid absorber and emitter. Electrophoretic toner particles are suspended in the liquid in the gap, such that the liquid and toner function as a developer of a visible image.

One mode of operation of the system of FIG. 1 is illustrated in FIGS. 2 and 3, with the horizontal axis of the timing diagrams of FIG. 3 representing time with one cycle of operation divided into segments A, B, C and D. The voltage across the electrodes is represented by curve 55, the X-ray source on time is represented by the curve 56, and the viewing time is represented by the curve 57. At the end of time segment A, there is no voltage across the electrodes and the toner particles 52 are dispersed throughout the liquid absorber in the gap 16. In time segment B, the X-ray source is energized and a high voltage is connected across the electrodes with the electrode 14 negative. Incoming X-rays are absorbed in the gap and electrons (or negative ions) and positive ions are generated, as indicated in FIG. 2B. The electrons are rapidly moved to the electrode 13 and the positive ions are rapidly moved to the electrode 14 under the influence of the field through the gap collecting at the gap face of the layer 22 which functions as a dielectric, providing the electrostatic charge image as shown in FIG. 2C. The electrostatic charge image remains after the X-ray source is turned off. The electrophoretic toner particles 52 are relatively bulky compared to the electrons and positive ions and therefore do not travel nearly as fast as the electrons and positive ions, that is, there is a substantial differential in the mobility of the particles and the electrons and ions in the liquid absorber. Hence as shown in FIG. 2C, the particles remain in the liquid during the relatively short time the high voltage is connected across the electrodes. The voltage across the electrodes is reduced in time segment D and electrophoretic particles are attracted to the electrode 14 at those portions which do not have positive ions thereon. The positively charged electrophoretic particles are repelled by the positive ions on the electrode 14. This selective depositing of the particles as shown in FIG. 2D provides the desired image which can be viewed during the time segment D.

At the end of the viewing time, the potential across the electrodes may be reversed for a short time, as indicated at 58 to move the particles from the electrode back into the dispersion. A typical exposure and viewing cycle may occur in one-tenth of a second, providing ten viewing frames per second. During time segment A, the electrostatic charge image is discharged through the layer 22.

It will be readily understood that the specific voltages shown in curve 55 are not required and that various other voltage application schemes can be utilized. Two alternatives are shown in curves 59 and 60. In curve 59, there is no reverse voltage applied and in curve 60, the reverse voltage is applied throughout time segment A. In another alternative, the time segment C may be omitted.

A dark field illumination mode is shown in FIG. 1. A light wave of substantially total internal reflection is produced in the plate 21. This may be achieved by introducing light from the lamp 42 into the edge of the plate 21 at the appropriate angle for achieving internal reflection at the interfaces. When a toner particle rests on the external surface at the reflection interface, it will disrupt the incident internal wave and scatter the radiation, thus becoming a point source of light when viewed from the exterior of the imaging chamber. Other locations on the inner surface of the electrode 14 which do not have a toner particle to serve as a scattering center will appear perfectly black if the electrode 13 is opaque.

The dark field illumination mode is preferred for direct viewing of the image, since it can be obtained with fewer deposited particles and a lower X-ray dosage. When it is desired to make a spot film or photograph of the image, the system may be switched to the reflection illumination mode with the X-ray dosage increased for a single pulse, thus creating a higher electrostatic charge and a greater particle deposit at the viewing window. During this time, the lamp power supply 41 may be turned on to energize the lamp 40, rather than the lamp power supply 43. This switching may be accomplished by the switch control unit 36.

The gaps between the electrodes have been shown relatively large in the drawings. However this is for illustrative purposes only and the gaps are relatively small. When a liquid absorber and emitter is used, a gap typically is in the order of one millimeter. Reference may be made to U.S. Pat. No. 3,965,352 for more information on this real time imaging system.

The device in the example of FIGS. 4 - 6 includes electrodes 70, 71 mounted in spaced relation by wall members 72, 73 providing a gap 74 between the electrodes. A photoresponsive layer 75 is carried on the gap face of the electrode 70. The conductivity control layer 22 is carried on the layer 75.

The electrode 70 should be of a material which is substantially transparent to the radiation from the image which is to be viewed, and typically comprises a thin transparent film of an electrical conducting material such as a metal oxide, carried on a glass or plastic support plate 80. The electrode 71 should be substantially transparent at the wavelength which will be used for viewing and may be constructed similarly to the electrode 70, carried on a support plate 81.

A power supply 85 is connected across the electrodes 70, 71 by a control switch 86 which provides for connecting the power supply with one polarity and with the opposite polarity. A timing diagram for operation of the power supply is shown in FIG. 5 with the intervals A, B and C corresponding to FIGS. 6A, 6B and 6C, respectively.

The system includes means for illuminating the electrode 71 and in the preferred embodiment illustrated in FIG. 4, a source of light, such as a lamp 88 and reflector 89, is provided at an edge of the plate 81. Light sources may be provided at more than one edge if desired. The light is introduced at an angle such that it is reflected from the faces of the plate 81, rather than being transmitted through the faces, with the plate functioning as a light waveguide and providing a dark field to the viewer at 90. The image produced by the device may be viewed directly or through a lens system, may be copied by a camera or a TV system, may be stored or transmitted, or otherwise handled as desired.

In operation, radiation from the image to be viewed is directed through the plate 80 and electrode 70 to the photoresponsive layer 75, typically through a lens 92. In one embodiment, the photoresponsive layer 75 is a photoconductor material which is made selectively electrically conducting by the incoming radiation. Then during time B with the electrode 70 negative and the electrode 71 positive, electrons or negative ions move from the electrode 70 through the layer 75 to the conductivity control layer 22, producing an electrostatic charge image at the gap surface with a density variation corresponding to the incoming radiation image.

A plurality of electrophoretic particles 95 are suspended in a dielectric liquid in the gap 74. After the externally applied voltage is turned off, the electrostatic charges at the layer 75 produce movement of the particles 95 to selectively deposit particles at the electrode 71, with the deposited particles forming an image corresponding to the electrostatic charge image at the layer 75. This occurs during time C and is illustrated in FIG. 6C.

The deposited particles at the electrode scatter the light which travels through the light guide, producing a visible image. The zones of the electrode which do not have particles deposited remain dark, so that the scattered light is viewed against a dark background. After viewing is completed, a voltage of the reverse polarity is applied across the electrodes to discharge the electrostatic charge image and move the electrophoretic particles from the electrode. This occurs in time A to produce the condition of FIG. 6A. A typical operation cycle may take about 1/10 of a second, producing ten images per second.

In an alternative mode, the photoresponsive layer 75 may be a photoemitter material which produces electrical charges when exposed to radiation. The photoresponsive material 75 should be responsive in the wavelength range which is to be viewed. Similarly, the electrode 70 and support plate 80 should be substantially transparent in this band. Similarly, the electrode 71 and the support plate 81 should be substantially transparent in the wave band used for viewing, which need not be the same as that of the image being viewed. The device may be used as a dark viewing device for operation at night, with the layer 75 operating in the infrared range, while the viewing radiation from the lamps 88 operate in the visible range at a wavelength providing optimum gain. With devices of this type, low noise stages with gain in the order of 10,000 appear readily achievable. In another mode, the device may be used for viewing with low levels of visible light, with the layer 75 responsive in the visible range or some portion thereof. The device may be made selective for various wave bands, by having the layer 75 and associated electrode 70 and support plate 80 with a first pass band and the electrode 71 and plate 81 with a second pass band.

One or more edges of the conductivity control layer are connected to circuit ground, as shown in FIG. 4, for discharging the electrostatic charge thereon. Lamps 88 of FIG. 4 correspond to lamp 42 of FIG. 1, and additional lamps and associated controls corresponding to lamps 40, 45 may be used in the device of FIG. 4 if desired. Reference may be made to said copending application for additional information and examples of devices of the type shown in FIG. 4.

In one embodiment, the conductivity control layer 22 is formed of a poor conductivity type material which is sometimes referred to as a leaky insulator. This provides a self erasing function, with the layer having sufficiently low conductivity for creation of electrostatic image while having sufficiently high conductivity to permit the electrostatic charges to leak through the electrode by the end of the viewing cycle. The charge relaxation time of the layer should be about 10 to 0.01 seconds, corresponding to the repetition rate of one-tenth of an exposure to 10 exposures per second for the system. Preferably, the layer has a resistivity in the range of about $10^{10}$ to $10^{13}$ ohm centimeters. Suitable thicknesses typically are in the range of 1 to 500 micrometers. In all embodiments, the resistivity is to be chosen so that the charge image will decay with a relaxation time approximately equal to the cycle time (time between successive images). The layer thickness must be chosen so that the optical density of the image surface is no greater than about 0.5, and the light scattering low enough not to impair image contrast.

Typical materials for the leaky insulator type of conductivity control layer include silicon nitride, prepared by reactive sputtering, reactive plasma deposition or chemical vapor deposition; silicon monoxide, prepared by vacuum evaporation or reactive sputtering; boron nitride, prepared by chemical vapor deposition or reactive plasma deposition; titanium dioxide, prepared by reactive sputtering, chemical vapor deposition or pyrolysis of organic titanates; transition-metal oxide glasses (e.g. manganese, vanadium), prepared by fusion, grinding, sedimentation, re-fusion or RF sputtering; doped silica glasses, prepared by chemical vapor deposition, "Emulsitone" solutions (spin-on) or reactive plasma deposition; and "Polyohm" organic lacquer, prepared by solvent evaporation.

In an alternative embodiment, the layer 22 may be a photoconductor material having a low conductivity state and a high conductivity state. Preferably, the layer will have a resistivity greater than about $10^{11}$ to $10^{14}$ ohm centimeters in the dark or off or low conductivity state according to the desired repetition rate, and less than about one tenth and preferably about 1/100 of this value in the light or on or high conductivity state.

In operation, the radiation from the viewing lamp 40 or 42 is selected of a wavelength band that will not affect the photoconductor layer 22. Then during time segment A, lamp 45 is energized and provides radiation in a wavelength band which causes the photoconductor layer to switch from the low conductivity state to the high conductivity state, thereby discharging the electrostatic charges through the layer to the electrode. When the lamp 45 is turned off, the layer recovers its low conductivity condition in a relatively short time, typically 20 milliseconds, and is ready for the next X-ray exposure.

A variety of materials are available for use as the photoconductor material in the conductivity control layer, both organic and inorganic.

The organic photoconductor may be a sensitizing dopant in a polymer with a dye sensitizer added where desired. Examples of suitable materials are set out below.

I. Polymers

Poly-n-vinyl Carbazole (PVK)
Polystyrene
Polyvinylxylene
Poly-1-vinylnaphthalene
Poly-2-vinylnaphthalene
Poly-4-vinylbiphenyl
Poly-9-vinylanthracene
Poly-3-vinylpyrene
Poly-2-vinylquinoline
Polyindene
Polyacenaphthylene
Poly (3,3′=dimethyldiphenylene-4,4′)

II. Sensitizing Dopants

Hexabromonaphthalic anhydride
9,10-dibromoanthracene
Tetracyanoethylene (TCNE)
Dibromomaleic anhydride (DBMA)
1,3,5-trinitrobenzene (TNB)
2-nitroindanedione-(1,3) (NID)
9,10-dichloroanthracene (DCA)
anthraquinone (AQ)
2,4,7-trinitrofluorenone (TNF)
picric acid
3,5-dinitrosalicylic acid
9-nitroanthracine
cyanoacetic acid
2-cyanocinnamic acid
9-cyanoanthracene
fumaric acid
maleic acid
phthalic acid
benzenephosphonic acid
phthalic anhydride
terephthalic dimethyl ester
tribomo-p-xylene
triphenylchloromethane
octachloronaphthalene
chloranil
phenanthrenequinone
pyrene-3-aldehyde
benzil
benzoin
xanthone
2,2′-pyridyl III. Dye Sensitizers Rhodamine B
Crystal Violet
Methylene Blue
Malachite Green
Pinacyanol The inorganic photoconductors typically are thin film and examples are set out below.

| Material | Preparation Methods |
|---|---|
| Cadmium Sulfide | vacuum evaporation |
| Selenium | vacuum evaporation |
| Cadmium Selenide | vacuum evaporation |
| Alloys of Selenium with: Sulfur, Tellurium, Arsenic | vacuum evaporation |
| Antimony Trisulfide | vacuum evaporation |
| Arsenic Trisulfide | vacuum evaporation |
| Silicon Nitride | reactive plasma deposition, chemical vapor deposition, reactive sputtering |
| Titanium Dioxide | chemical vapor deposition, reactive sputtering, pyrolysis |
| Zinc Oxide, Zinc Sulfide, Zinc Selenide | Sputtering, reactive sputtering, evaporation, co-evaporation, reaction of the metal film |

Many of the organic photoconductors are sensitive mostly in the ultraviolet range. With this type of material, the viewing lamps 40 and/or 42 may be selected and/or used with appropriate filter to provide radiation in the visible range while providing no radiation in the ultraviolet range. The lamp 45 can be selected to produce ultraviolet radiation and is flashed during the time segment A to make the layer highly conducting and discharge the electrostatic charges. In situations where the photoconductor material is sensitive in some portion of the visible range, a narrow band light source may be used for viewing and a broadband light source used for erasing. Alternatively, the viewing and erasing light may be one and the same. Although the charge image is erased by the light flash, the toner image will cling weakly to the surface due to the short-range (van der Waals) forces, and can be viewed until it is electrically erased.

Since the visual image is formed by the toner particles on the gap face of the layer 22, all of the materials between the gap and the viewer should be as optically transparent as possible for optimum image quality. This is true for all embodiments of the conductivity control layer.

We claim:

1. In an electrostatic imaging chamber for providing a visual image and having
- first and second electrodes;
- means for supporting said electrodes in spaced relation with a gap therebetween, with said first electrode being relatively transparent optically,
- a plurality of electrophoretic particles in said gap, and
- means for connecting an electric power source across said electrodes for attracting electrons and negative ions toward one electrode and positive ions toward the other depending upon the polarity of the power source and forming an electrostatic charge image,
- the improvement comprising a conductivity control layer at one surface of said gap, with said electrostatic charge image formed at said layer,
- with said particles being selectively moved toward said first electrode as a function of said electrostatic charge image forming a visual image viewable through said first electrode, and with said electrostatic charge image being discharged through said layer.

2. An imaging chamber as defined in claim 1 wherein said conductivity control layer has a resistivity in the range of about $10^{10}$ to $10^{13}$ ohm centimeters.

3. An imaging chamber as defined in claim 1 wherein said conductivity control layer has a relaxation time in the range of about 1/100 of a second to about 10 seconds.

4. An imaging chamber as defined in claim 1 wherein said conductivity control layer includes a photoconductor material having a relatively low conductivity state and a relatively high conductivity state.

5. An imaging chamber as defined in claim 4 including means for directing radiation onto said conductivity control layer for switching said layer from the low conductivity state to the high conductivity state.

6. An imaging chamber as defined in claim 5 wherein said layer has a resistivity greater than about $10^{11}$ to $10^{14}$ ohm centimeters when in said low conductivity state, selected according to the desired repetition rate, and a resistivity less than about one-tenth the low conductivity state resistivity when in said high conductivity state.

7. An imaging chamber as defined in claim 6 wherein the resistivity of said layer when in said high conductivity state is less than about one-hundreth the low conductivity state resistivity.

8. An imaging chamber as defined in claim 4 including means for directing onto said first electrode radiation in a first wavelength band to which said photoconductor material is substantially insensitive, with the deposited particles reflecting such radiation, and means for directing onto said first electrode radiation in a second wavelength band to which said photoconductor material is sensitive, with said photoconductor material switching from the low conductivity state to the high conductivity state.

9. An imaging chamber as defined in claim 8 including means for selectively energizing said first and second means.

10. An imaging chamber as defined in claim 4 wherein said first electrode includes a support plate with an electrical conducting layer thereon, and including first means for directing into said plate from an edge, radiation in a first wavelength band to which said photoconductor material is substantially insensitive, with the deposited particles scattering such radiation, and second means for directing onto said first electrode radiation in a second wavelength band to which said photoconductor material is sensitive, with said photoconductor material switching from the low conductivity state to the high conductivity state.

11. An imaging chamber as defined in claim 10 with said radiation from said first means directed into said plate at an angle to produce substantially total reflection of the radiation internally of the plate except for that scattered by the deposited particles.

12. An imaging chamber as defined in claim 4 including means for cyclicly actuating said imaging chamber to provide real time visual imaging and including means for energizing an X-ray source for a short portion of each cycle and simultaneously energizing an electric power source for attracting electrons and positive ions, energizing a first source of radiation in a first wavelength band to which said photoconductor material is substantially insensitive for viewing the deposited particles for a subsequent portion of the cycle, and energizing a second source of radiation in a second wavelength band for switching said photoconductor material from the low conductivity state to the high conductivity state for discharging said conductivity control layer subsequent to the viewing.

13. An imaging chamber as defined in claim 12 wherein said control means includes means for connecting a relatively high voltage supply to said electrodes while the X-ray source is energized and then connecting a relatively low voltage supply to said electrodes.

14. An imaging chamber as defined in claim 13 wherein said control means includes means for connecting a voltage supply of reverse polarity prior to energizing the X-ray source.

15. An imaging chamber as defined in claim 12 wherein said control means includes means for connecting a voltage supply of reverse polarity prior to energizing the X-ray source.

* * * * *